Patented Aug. 17, 1926.

1,596,483

UNITED STATES PATENT OFFICE.

FREDERICK F. FRICK, OF ANACONDA, MONTANA, ASSIGNOR TO ANACONDA COPPER MINING COMPANY, OF ANACONDA, MONTANA.

PROCESS FOR THE RECOVERY OF VANADIUM.

No Drawing. Application filed October 16, 1925. Serial No. 62,889.

This invention relates to a process for the recovery of vanadium, an object of the invention being to obtain a good yield of the vanadium in a commercially pure form suitable for use, for instance, in the manufacture of ferrovanadium from materials containing vanadium and impurities such as arsenic and phosphorus.

The process, although applicable for the recovery of vanadium from vanadium-containing materials in general, has been developed particularly in connection with the recovery of the vanadium content of so-called burned sawdust residues produced by the treatment of phosphate rock described in United States Patent No. 1,544,911. In the process of that patent phosphate rock is leached with sulfuric acid, the resulting solution is treated with a soluble ferrocyanide to precipitate the vanadium and the precipitate is treated with an alkali to regenerate the soluble ferrocyanide for re-use, leaving a residue rich in vanadium but containing also objectionable quantities of impurities. A typical analysis of this residue which has been referred to as "burned sawdust residue" is 6 to 10 percent of V and about 20 percent of $Fe_2O_3$, 28 percent of CaO, 4 percent of $Na_2O$, 5 percent MgO, 1 percent of $P_2O_5$ and 0.1 percent of $As_2O_3$.

The process will be described and illustrated in connection with the treatment of this material or residue. The residue is boiled with a sufficient quantity of dilute sulfuric acid solution, about 20 percent, to give a solution containing about 20 grams of vanadium per liter and an extraction of about 99 percent of the vanadium content of the residue. The resulting solution is separated from insoluble matter which contains the bulk of the calcium content of the residue as calcium sulfate. The separated solution contains vanadium sulfate besides iron, phosphorus and arsenic compounds and other impurities which must be separated. The solution is reduced to dryness, preferably by mixing it with a sufficient quantity of the dry product of a previous operation, so that the mixture may be evaporated without crusting or sticking to the hot surfaces of the evaporating apparatus. The resulting dry material is then calcined at a dull red heat, as a result of which the iron and vanadium sulfates are partially decomposed, giving a loose pulverulent mass containing 25 to 30 percent of $SO_4$. This mass is mixed with 75 to 100 percent of its weight of soda ash and the mixture fused at a bright red heat. The melt is then granulated in water and leached. The products of the leaching operation are a residue containing practically all of the iron content of the starting material and a solution containing the vanadium in the form of sodium vanadate and also arsenic, phosphorus, alkali metals, alkaline earth metals and sulfates. The solution is acidified to about 10 grams of free sulfuric acid per liter and boiled with the addition of a small amount of an oxidizing agent, preferably potassium chlorate, in quantity equal to 5 to 15 percent of the weight of the vanadium in the solution. This treatment results in the precipitation of about 95 percent of the vanadium content of the solution as the red vanadium pentoxid. The phosphorus and arsenic contents of the solution are not precipitated. The precipitated vanadium pentoxid is separated from the reaction mixture and washed with a dilute sulfuric acid solution containing about 5 grams of sulfuric acid per liter. The washed precipitate contains about 90 to 95 percent of the vanadium content of the starting material and is substantially free of phosphorus and arsenic, being sufficiently pure in this respect to permit its use for the preparation of high grade ferrovanadium alloys.

In the foregoing description I have given what I now regard as the best method of treating a vanadium containing material of the character of the burned sawdust residue, but I appreciate that many changes and variations of the method may be made, either to better adapt it to the treatment of a different starting material or merely to suit the convenience or personal preference of the operator, without departing from the principles of the invention which are generally as follows: The first step is to get the vanadium with such impurities as may accompany it into a sulfate solution, thus eliminating the bulk of the calcium content of the starting material. The second step is to evaporate the sulphate solution and ignite it to partly decompose the sulphates. The third step is to fuse the ignited residue from the preceding step with an alkali or alkaline carbonate in order to render the vanadium soluble and the iron insoluble in water. The fourth step is to dissolve the vanadium and such impurities as may accompany it, thus eliminating the iron. The fifth step is to precipitate the vanadium as the pentoxid from a slightly acid solution, thus eliminating such impurities, including arsenic and phosphorus compounds, as are not precipitated by an oxidizing agent in an acid solution. Any process involving these principal steps or variations thereof or substitutes therefor or the addition or elimination of a step or steps in case it is possible or convenient in the treatment of a particular material, may be regarded as falling within the scope of my invention.

I claim:—

1. Process for the recovery of vanadium which comprises leaching a crude vanadium-containing material with sulfuric acid, reducing the resulting solution to dryness, fusing the dry residue with soda ash, extracting the fusion with water, acidifying the extract, adding a chlorate to the acidified extract, and boiling the mixture.

2. Process for the recovery of vanadium which comprises extracting a material containing vanadium, calcium, iron, phosphorus and arsenic compounds with sulfuric acid, separating the resulting solution from insoluble matter, adding to the solution the solid residue produced by evaporating a similar solution to dryness, reducing the mixture to dryness, fusing the dry mixture with soda ash, extracting the fusion with water, acidifying the solution, and boiling the acidified solution with the addition of an oxidizing agent.

3. Process of recovering vanadium which comprises mixing an acid extract of a vanadium-containing material with the dry residue of a similar solution from a previous operation, and reducing the mixture to dryness.

In testimony whereof, I affix my signature.

FREDERICK F. FRICK.